United States Patent
Fleck (10) Patent No.: US 8,783,788 B2
(45) Date of Patent: Jul. 22, 2014

(54) METHOD OF COVERING A WHEEL FOR DECORATION, STREAMLINING, OR ADVERTISING DISPLAY, AND A FLEXIBLE WHEEL COVER THEREFOR

(75) Inventor: Jonathan E Fleck, St. Paul, MN (US)

(73) Assignee: Moochout LLC, St. Paul, MN (US)

(*) Notice: Subject to any disclaimer, the term of this patent is extended or adjusted under 35 U.S.C. 154(b) by 1431 days.

(21) Appl. No.: 12/440,726

(22) PCT Filed: Sep. 11, 2007

(86) PCT No.: PCT/US2007/078155
§ 371 (c)(1),
(2), (4) Date: Dec. 16, 2010

(87) PCT Pub. No.: WO2008/100338
PCT Pub. Date: Aug. 21, 2008

(65) Prior Publication Data
US 2011/0101767 A1    May 5, 2011

Related U.S. Application Data

(60) Provisional application No. 60/843,726, filed on Sep. 11, 2006.

(51) Int. Cl.
*B60B 7/04* (2006.01)
*B60B 7/12* (2006.01)

(52) U.S. Cl.
USPC ............... 301/37.102; 301/37.32; 301/37.36; 301/37.109

(58) Field of Classification Search
CPC ........... B60B 7/04; B60B 7/06; B60B 7/063; B60B 7/0073; B60B 7/08; B60B 7/12
USPC ............ 301/37.28, 37.101, 37.102, 37.41, 301/37.32, 37.33, 37.35, 37.36, 37.109, 301/37.25, 37.106, 37.12, 37.24, 6.3; 40/587

See application file for complete search history.

(56) References Cited

U.S. PATENT DOCUMENTS

| 1,186,073 A | 6/1916 | Brown |
| D49,555 S | 8/1916 | Vivaudou |

(Continued)

FOREIGN PATENT DOCUMENTS

| CN | 2551488 Y | 5/2003 |
| DE | 104454 | 5/1923 |

(Continued)

OTHER PUBLICATIONS

International Search Report and Written Opinion, PCT/US2007/078155, dated Jun. 11, 2008, 7 pages.

(Continued)

*Primary Examiner* — Kip T Kotter
(74) *Attorney, Agent, or Firm* — Polsinelli PC (57) ABSTRACT

A method and apparatus (10) is disclosed for covering a cavity (11) of a wheel of a long-haul tractor-trailer, truck or the like for decoration, streamlining, and/or advertising display. Such wheels have a face, a rim, the interior of the rim defining the cavity, a boss (30) on the rim having a relatively smaller diameter and spaced from the face. The disclosed method includes providing a device (10) comprising a generally flat cover portion sized to cover the outwardly facing opening of the wheel cavity, an opening through the device, and a releasable fastener (15) for selectively closing the opening through the device, and an attachment system (12) that is sized to extend axially across the boss of the wheel to the covered, accessing the attachment system through the opening, positioning the attachment system over the boss of the wheel by way of the opening, and closing the opening, such that the cover portion closes substantially all the outwardly facing opening of the wheel.

19 Claims, 7 Drawing Sheets

(56) References Cited

U.S. PATENT DOCUMENTS

| | | |
|---|---|---|
| 1,503,397 A | 10/1923 | Wacker |
| 1,616,155 A | 2/1927 | Uebelmesser |
| 1,832,605 A | 11/1931 | Zallio |
| 1,854,861 A | 4/1932 | Reeves |
| D97,231 S | 10/1935 | Jackson |
| 2,174,087 A * | 9/1939 | Horn .................... 301/37.34 |
| D118,499 S | 1/1940 | Kraeft |
| 2,550,222 A | 4/1951 | Carlin |
| 2,614,001 A | 10/1952 | Rycroft |
| 2,631,895 A | 3/1953 | Hunt |
| 2,903,300 A | 9/1959 | Hurd |
| 2,996,337 A | 8/1961 | Hurd |
| 3,010,764 A | 11/1961 | Hurd |
| 3,145,058 A | 8/1964 | Demrick et al. |
| 3,317,247 A | 5/1967 | Lamme |
| 3,322,468 A | 5/1967 | Spisak |
| 3,410,436 A | 11/1968 | Foss et al. |
| 3,480,329 A | 11/1969 | Foster et al. |
| 3,512,840 A | 5/1970 | Foster et al. |
| 3,532,385 A | 10/1970 | Foster et al. |
| 3,724,906 A | 4/1973 | McCarroll |
| 3,918,763 A | 11/1975 | Harris |
| 4,214,683 A | 7/1980 | Wills |
| 4,241,954 A | 12/1980 | Brown |
| 4,290,619 A | 9/1981 | Goodall |
| 4,291,921 A | 9/1981 | Wulf |
| 4,436,319 A | 3/1984 | Clutter |
| 4,445,700 A | 5/1984 | Schroeder |
| D286,028 S | 10/1986 | DiFede |
| 4,620,749 A | 11/1986 | McEachern |
| 4,706,981 A | 11/1987 | Dorwart |
| 4,793,658 A | 12/1988 | Brown |
| D303,648 S | 9/1989 | Clark |
| D309,564 S | 7/1990 | Rayner |
| D321,137 S | 10/1991 | Hofmann et al. |
| 5,135,289 A | 8/1992 | Fleck et al. |
| 5,167,440 A | 12/1992 | FitzGerald |
| 5,316,376 A | 5/1994 | Defreitas |
| D353,768 S | 12/1994 | Hayes |
| D376,567 S | 12/1996 | Davidson et al. |
| D387,725 S | 12/1997 | Cochran et al. |
| D390,461 S | 2/1998 | Piselli |
| D405,041 S | 2/1999 | Bidwell et al. |
| 5,897,172 A | 4/1999 | Jarrell |
| 5,931,543 A | 8/1999 | Smith |
| 5,996,863 A | 12/1999 | Burke |
| 6,116,415 A | 9/2000 | Rastelli |
| D434,714 S | 12/2000 | White |
| D489,611 S | 5/2004 | Monsanty |
| D489,654 S | 5/2004 | Carter |
| D492,596 S | 7/2004 | Miceli et al. |
| 6,783,189 B1 | 8/2004 | Russell et al. |
| D526,608 S | 8/2006 | Hayashi |
| D532,691 S | 11/2006 | Vogel |
| D534,844 S | 1/2007 | Eskandry |
| D545,106 S | 6/2007 | Hourihan |
| 7,246,860 B1 | 7/2007 | Seitz |
| D560,153 S | 1/2008 | Zane |
| D573,077 S | 7/2008 | Addink |
| D582,274 S | 12/2008 | Vogel |
| 7,472,966 B2 | 1/2009 | Goodman et al. |
| 7,478,723 B2 | 1/2009 | Spater et al. |
| D588,975 S | 3/2009 | Spater et al. |
| D597,837 S | 8/2009 | Stuart |
| 2003/0107260 A1 | 6/2003 | Ording et al. |
| 2005/0183973 A1 | 8/2005 | Spater et al. |
| 2005/0206220 A1 | 9/2005 | Polka |
| 2006/0158020 A1 | 7/2006 | Dagh et al. |
| 2007/0200421 A1 | 8/2007 | DoVale et al. |
| 2008/0230576 A1 | 9/2008 | Arabadjis |
| 2012/0212035 A1 | 8/2012 | Fleck |

FOREIGN PATENT DOCUMENTS

| | | |
|---|---|---|
| DE | 500213 | 5/1930 |
| FR | 396797 | 4/1909 |
| JP | 59-192675 | 11/1984 |
| JP | 62-157803 A | 7/1987 |
| WO | WO 00/54991 | 9/2000 |

OTHER PUBLICATIONS

Non-Final Office Action, U.S. Appl. No. 12/365,890, mailed Jun. 21, 2012, 14 pages.
Response to Non-Final Office Action, U.S. Appl. No. 12/365,890, filed Oct. 22, 2012, 9 pages.
Notice of Allowance, U.S. Appl. No. 12/365,890, mailed Nov. 1, 2012, 7 pages.
U.S. Appl. No. 12/365,890, filed Feb. 4, 2009, Fleck.
U.S. Appl. No. 29/283,059, filed Aug. 5, 2007, Fleck.
U.S. Appl. No. 29/303,249, filed Feb. 4, 2008, Fleck.
U.S. Appl. No. 29/365,565, filed Jul. 11, 2010, Fleck.
U.S. Appl. No. 13/399,632, filed Feb. 17, 2012, Fleck.

* cited by examiner

FIG. 13

METHOD OF COVERING A WHEEL FOR DECORATION, STREAMLINING, OR ADVERTISING DISPLAY, AND A FLEXIBLE WHEEL COVER THEREFOR

BACKGROUND

This patent application claims priority to U.S. patent application 60/843,726 filed Sep. 11, 2006, and claims benefit from PCT application PCT/US07/078155. The subject innovation deals with streamlining of motor vehicle wheels, in particular large wheels having what is called a "drop center" construction typically which are for tubeless tires and used on large, heavy-duty trucks such as long haul tractor-trailer trucks for interstate and long distance hauling as well as used on city, school, and interstate passenger buses. In particular U.S. Pat. No. 5,135,289 by Fleck et al., details a mounting system for a rigid disk shaped wheel cover to fill the cavity or void formed by the deeply recessed inner surface of the outward facing side of such large truck wheels.

BRIEF SUMMARY

Disclosed herein is a novel method for streamlining decorating, or otherwise covering the wheels of a truck. The method includes providing an attachment system that extends across the drop center portion of the interior circumference of the truck wheel to be streamlined, decorated, etc., positioning the attachment system over the drop center portion of the wheel, and attaching a generally flexible lamina to the thus positioned attachment system, such that the flexible lamina closes or covers substantially all the outwardly facing opening of the drop center wheel.

Also disclosed is a novel device for streamlining, decorating, or otherwise closing the outwardly facing cavity of a large motor vehicle wheel such as the wheel of a long-haul tractor trailer rig. The disclosed device includes an attachment system for holding the streamlining, etc., device in place. This attachment system includes a first generally stiff, generally circular ring sized to be positioned against and to grip firmly the inner facing surface of a large wheel, preferably to the inwardly facing side of a drop center portion of the vehicle wheel's interior. The attachment device further includes a second generally rigid, generally circular ring sized to be positioned against and to engage the inner facing surface of the wheel outwardly of the outwardly facing side of the drop center, and a generally flexible connection between these first and second rings. The innovative device further includes means for attaching a cover, preferably a disk shaped cover, to this attachment device, and further includes a generally flexible lamina in the form of a disk for attaching to the attachment means. Preferably this means for attaching is a means for alternately attaching and separating an outer circumference of the flexible lamina to the attachment device, such as a slide or "zipper" fastener system.

DETAILED DESCRIPTION

Referring to the figures, the typical motor vehicle wheel 11 to use and benefit from the disclosed method and device for streamlining etc; is sized to receive a conventional tubeless tire 100 in a variety of sizes such as those having a bead diameter of 17.5 inches, 19.5 inches, 22.5 inches, or 24.5 inches. These motor vehicle wheels have an inwardly facing, slightly tapering cylindrical cavity with a diameter that is correspondingly smaller than the corresponding bead size. For example, the 24.5 inch wheel has a tire-mounting rim with an interior diameter of about 22.5 inches. The interior surface of the wheel terminates on its inner circular end with the bolt ring or "wheel face" for attaching the wheel to the motor vehicle running gear, and at its outer end at the outer bead mounting rim. This hollow cylinder has typically an inwardly protruding boss or "drop center" 30 positioned between the tire bead engaging portions of the rim 60, typically about halfway between the outwardly facing rim of the wheel and the wheel face 50. Thus, this drop center has an inner diameter less than the inner diameter of the wheel at the outer rim 64 and at the wheel face 50. An exposed drop center construction is almost universally provided on current-day tubeless truck wheels. The primary purpose of this reduced diameter region of the wheel rim 60 is to provide a location on the outwardly facing circumference of the wheel that has a smaller diameter than at the rim portions of the wheel where the tire beads will ultimately seat for the sealing bead of the tire 100 to drop into when the wheel is being mounted onto or removed from the wheel rim.

Figure 10:
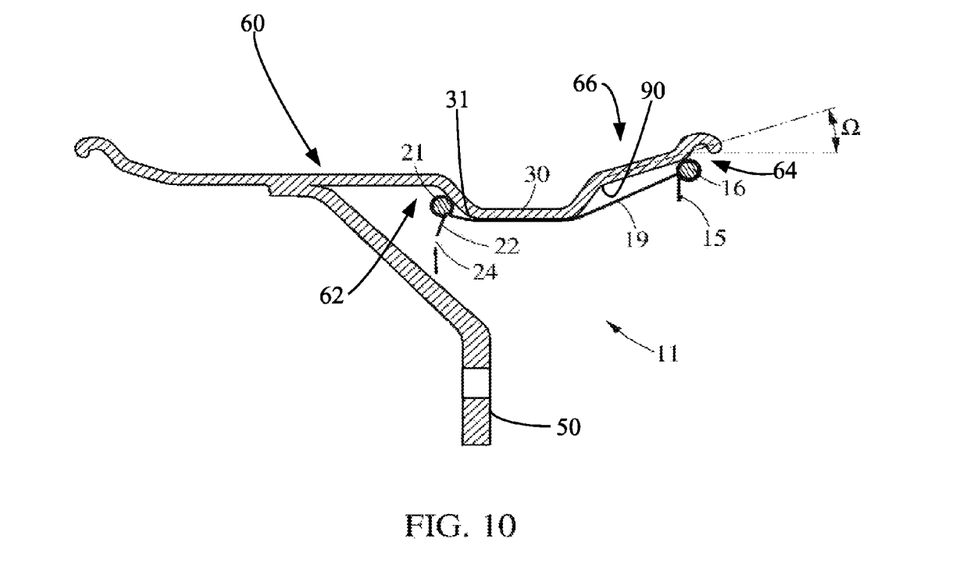
FIG. 10 is a cross section taken along line 10-10 of FIG. 9, showing a typical drop center wheel and the installed attachment system.

The depth of the hollow cavity 70 formed in the wheel is slightly less than the width of the rim 60 portion of the wheel. For large tractor-trailer trucks such wheels have a "bead to bead" width of about 8.25 inches although narrower wheels, such as those for motor homes may have only a width of about 6.75 inches. Such wheels may have differing locations for the drop center or boss portion. Also the inner surface diameter of these wheels may taper slightly at about a fifteen-degree rate from the outer rim 64 to the drop center at the inner portion 62 of the wheels (Shown as angle Q in FIG. 10 for example).

The disclosed innovation uses this drop center or other boss that projects inwardly from the circumferential wall of a truck wheel to help position and hold the attachment system 12 for the device in place. The attachment system 12 consists of an inner ring 21 and an outer ring 16. Each of these rings consists of a flexible but generally rigid and resilient hoop of resilient stainless steel wire. The spring steel wire from which these rings may be made has approximate cross-sectional diameter of between 0.100" and 0.250", preferably about 0.123". The diameter of each hoop or ring should correspond to the diameter of the inner surface 90 of the truck wheel where the ring will be positioned when holding the device 10 in place on the truck wheel 11. Thus if the inner diameter of the wheel is 20 inches then the outer diameter of the ring or hoop of steel wire should also be about 20 inches. The steel ring 21 preferably includes at least one and preferably two V shaped notches or kinks 25. As illustrated in the figures, this kinked portion 25 jogs around the air filler valve stem that is usually positioned between the face 50 of the wheel and the drop center or such relatively smaller diameter portion of the wheel cavity 70. This kink is where the ends of the spring steel wire are attached together, preferably by inserting these ends into an appropriately sized, V-shaped tube and attached to the wire ends by crimps 26, or otherwise fastened together in a way that will not permit them to come apart under normal operating conditions.

These two rings are interconnected with one or more strips of a flexible laminar material 19, which strip or strips are permanently sewn to the rings 16 and 21 and extend over the drop center or boss portion of the wheel when the attachment system is properly installed. In the figures, this material 19 is a polyvinyl chloride coated textile typically used for inflatable watercraft, truck tarps, or the like. This material is very durable and yet can be cut and sewn like many industrial textiles. This material 19 lends itself to being folded over and sewn to each of the rings as shown in the figures. The dimensions for this annular strip of coated textile are critical. It should be wide enough to form the flexible material 19 as shown to accommodate the drop center, yet position the outer ring 16 snugly within the corresponding outermost tapered portion 66 of the truck wheel near the outer tire engaging rim 60 of the wheel. This width dimension of flexible material 19 is critical to the self locating or self centering function of the disclosed cover device. The width of the flexible material 19 is determined in part by the finished width of the flexible material sewn between the rings 16 and 21. This dimension should be consistent around the entire circumference of the attachment system. It should be just long enough to place the outer ring 16 at the outermost edge of the tapered portion 66 of the wheel cavity 70 when the flexible material 19 is pulled between the inner or second ring 21 and is pulled tightly against the drop center. Thus, the second ring serves as an anchor held against the inward facing surface 31 of the drop center or other reduced diameter portion of the wheel to be covered, while the flexible connection 19 precisely controls the spacing between the second ring and the ring 16 and thus the cover 13. So, when properly dimensioned, the attachment system, including the flexible material 19, permits the cover portion to center itself on the tapered portion 66 of the wheel, even after it may become dislodged slightly from its ideal centered position on the wheel.

The surface contact between the wheel's inner surface 90 and the flexible material 19 connecting the two rings over the drop center is likely of particular importance. The greater the area of contact, the more secure the mounting. The frictional engagement between the attachment system 12 and the wheel 11 may be enhanced by using a material coating with a high coefficient of friction such as rubber, synthetic rubber, and the like. To further compliment the integrity of the mounting system, oval-shaped cutouts 20 permit the strip or strips of the flexible lamina 14 to conform to the smaller diameter of the drop center portion of the wheel 11, yet be firmly sewn to all or almost all of the circumferences of the steel rings 16 and 21.

Figure 13:
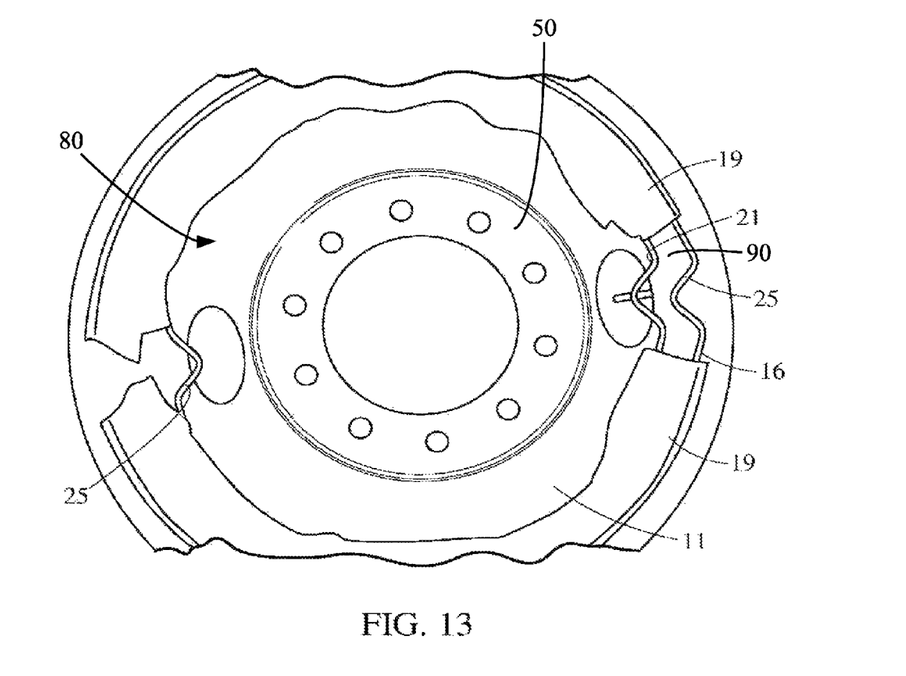
FIG. 13 shows an alternative construction of the attachment portion.

In an alternate embodiment, this continuous annular strip of textile material can be replaced or supplemented by several (between 8 and 12) hook and loop fastener strap pairs which extend between the inner and outer rings. Preferably, the inner spring steel ring would have a series of "D" rings positioned to receive conventional hook and loop cinch straps sewn to the outer ring. This hook and loop fastener scheme permits more precise dimensioning of the distance between the inner and outer ring and thus is more versatile because it accommodates wheels having various axial dimensions, or having their drop center portions of differing circumferences and at different distances from the outermost ring engaging edge of the wheel rim 60. A simpler alternative to the preferred construction is shown in FIG. 13, where the flexible lamina is provided in two strips, each extending between the first notch 25 (constructed of the crimped tube 26 as detailed above, and a second notch 25 formed in the wire ring.

Whether or not the inner and outer rings are connected with flexible lamina and/or adjustable straps, the outer ring 16 includes a sewn attachment to one track of an industrial strength zipper 15. This zipper extends around the entire circumferences of wheel and as sized to accommodate the corresponding zipper track 18, which in turn is attached to an outer periphery of the disk wheel cover 13.

Figure 1:
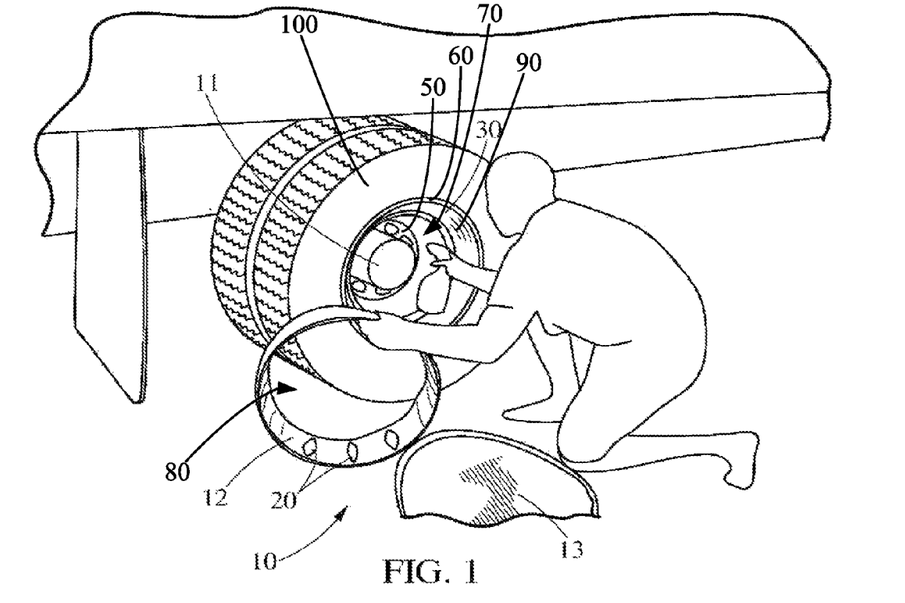
FIG. 1 shows a typical large motor vehicle wheel being prepared to receive the attachment device in the wheel covering method of this disclosure.
Figure 2:
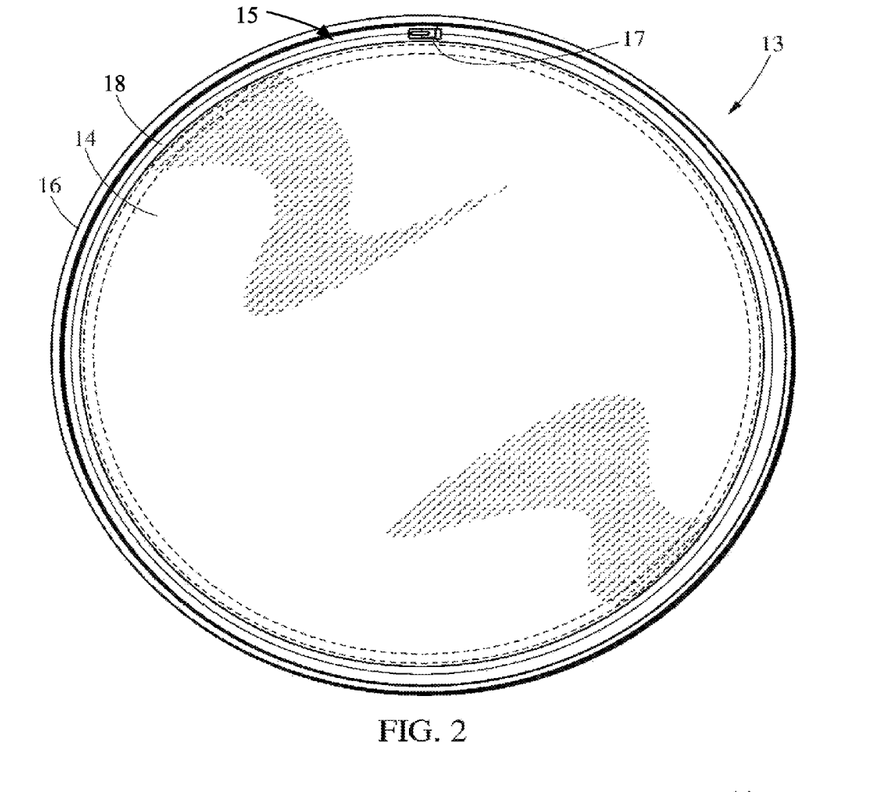
FIGS. 2 and 3 respectively are the front plan and side views of the preferred wheel covering device.
Figure 3:
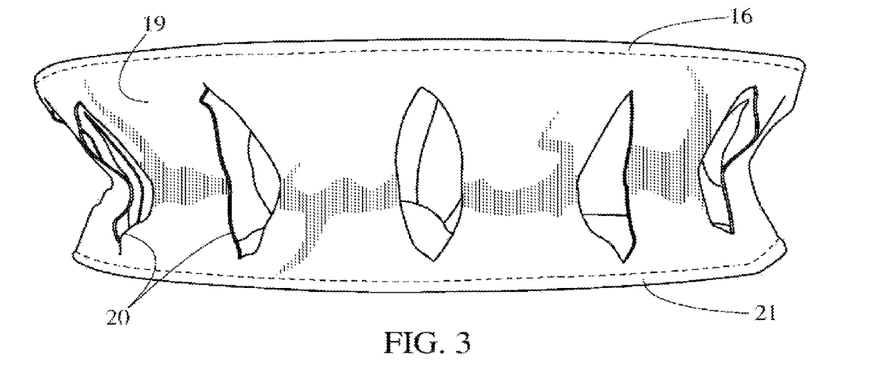
Figure 4:
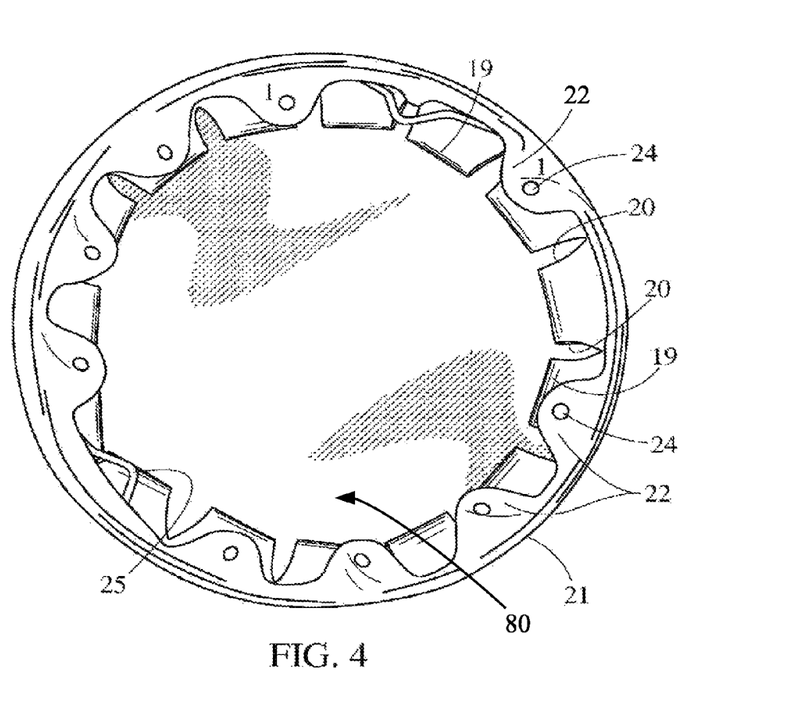
FIG. 4 is a rear plan view of the wheel covering device.
Figure 5:
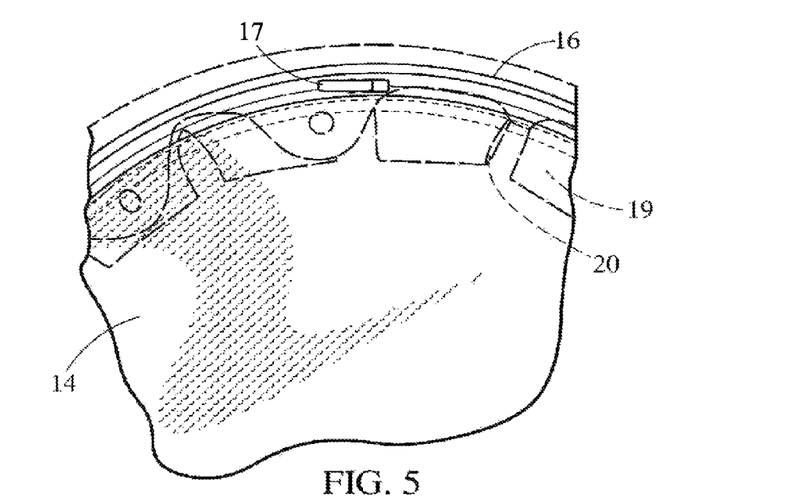
FIG. 5 shows a detail of FIG. 4 with the attachment portion shown in dashed lines.
Figure 6:
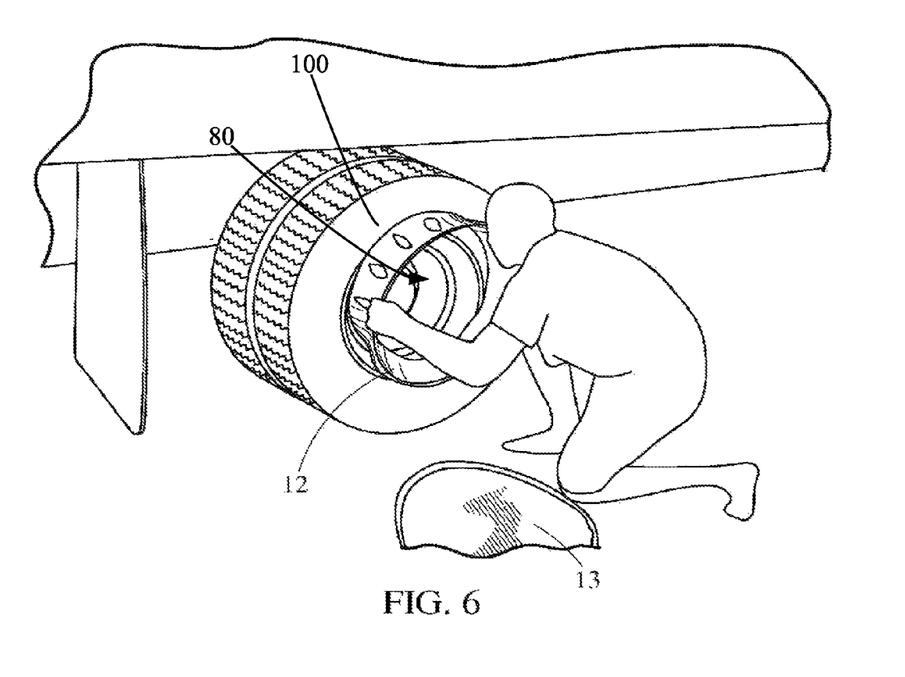
FIG. 6 shows the attachment portion being positioned within the cavity of the motor vehicle wheel.

FIG. 2 etc., shows this zipper track 18 sewn into the outer edge of the flexible lamina 14 that encases the outer ring 16. The zipper track 18 extends slightly more than 360 degrees around this outer ring so that the start and end of the zipper track overlaps slightly (see FIGS. 2 and 5).

Figure 7:
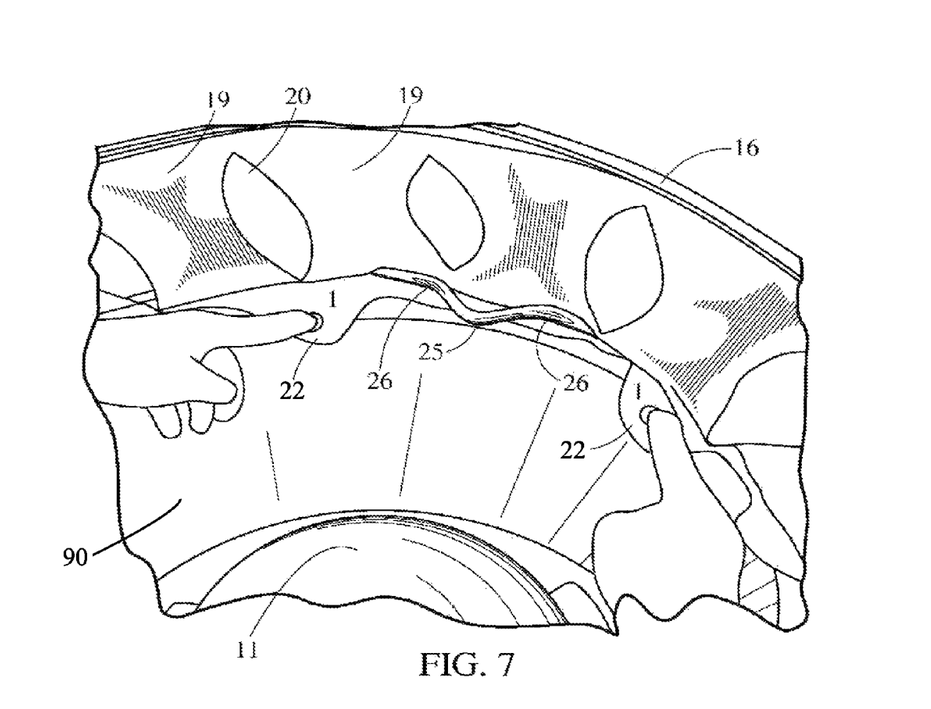
FIG. 7 shows a detailed view of a positioning step according to the method.
Figure 8:
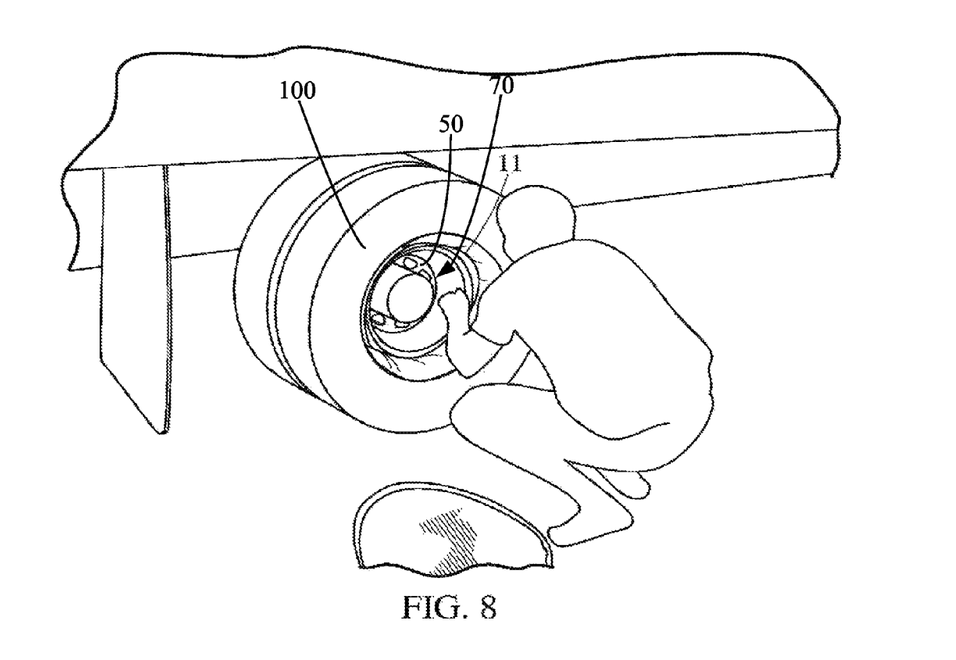
FIG. 8 shows the attachment portion properly positioned within the cavity of the wheel.
Figure 9:
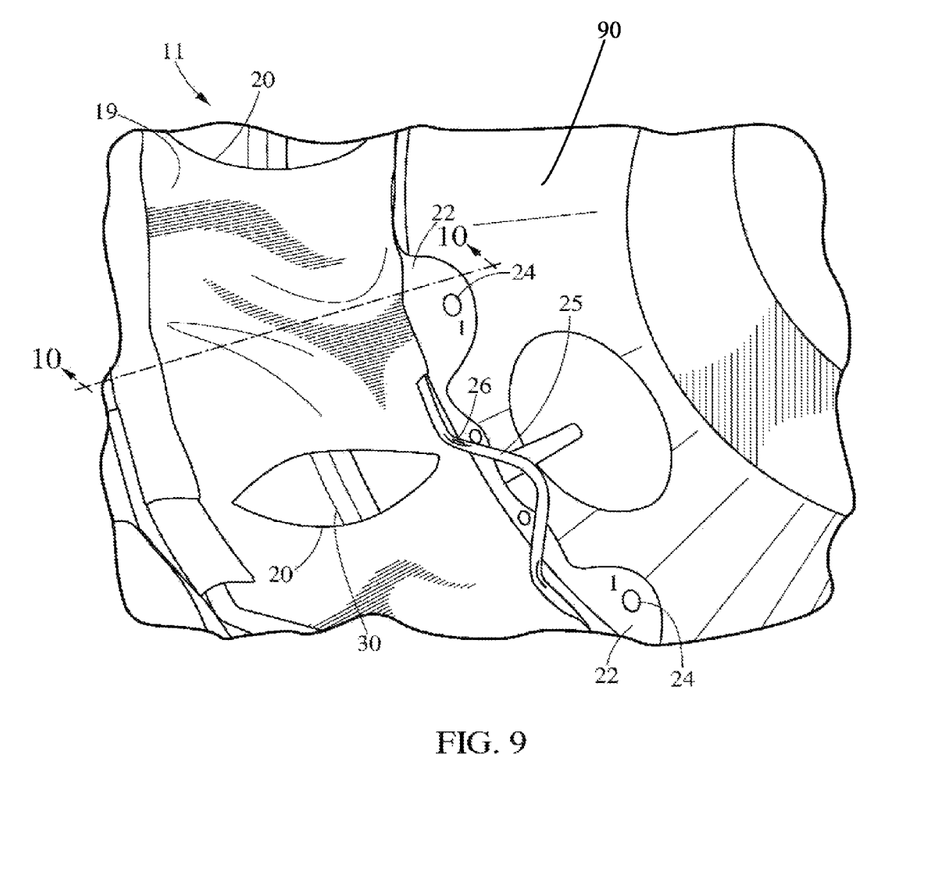
FIG. 9 is a close-up of the attachment portion in position within the wheel cavity.

FIGS. 1 and 6 through 10 illustrate steps in the process of closing the open cavity 70 in the wheel used to carry a long-haul truck or tractor trailer, including the steps of mounting the attachment system 12 within the cavity of the wheel 11 and fixing the wheel cover 13 to the attachment system. First, the attachment system and cover are unzipped from one another. Like any zipper connection, the subject attachment continues from fitting the tab of the zipper into the corresponding portion of the zipper slider 17, and the slider is moved along the corresponding zipper track 18 until the wheel disk is attached as shown in FIG. 7.

Figure 11:
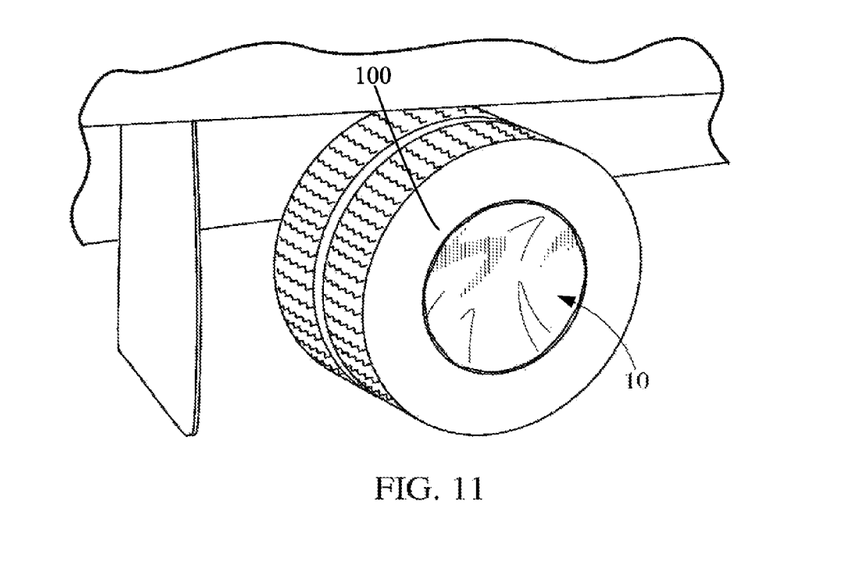
FIG. 11 shows the disk shaped lamina in an attached position on the wheel covering the cavity of the wheel.
Figure 12:
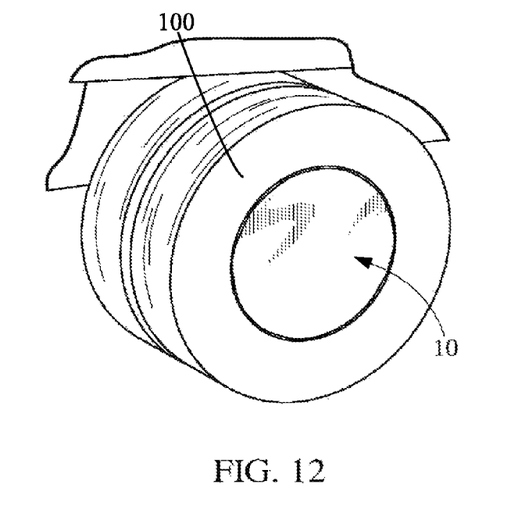
FIG. 12 shows the assembled streamlining flexible disk with the motor vehicle and its wheel moving at high velocity on a test run.

FIG. 11 shows the completed streamlined long-haul tractor trailer or truck or motor coach wheel. The cover portion itself should be a durable textile material similar to the flexible material 19 shown connecting the rings 16 and 21. In this particular case the material of choice is a polyvinyl chloride coated textile of the type described above. As a result of this overall textile construction, the overall weight of the finished streamlining wheel cover is remarkably low. Since the textile is inherently weather resistant and quite durable, it can withstand the rigors of road travel quite well, but still perform the function of reducing the overall wind resistance of the wheel cavity 70 when the wheel is moving at velocity down the highway, decorating the wheel, or preferably the several wheels, providing advertising space, and the like. FIG. 13 shows the streamlining cover as it functions to reduce the wind resistance and drag relative to an uncovered drop center wheel. The cover likely forms a barrier—isolating the low pressure of the wheel cavity 70 from the high pressure environment of the air rushing by. Ideally, the cover would be as aerodynamic as possible although simply isolating the two atmospheres of differing pressures should have beneficial effect to the overall drag reduction function desired. If a flatter or convex wheel cover is desired, a rigid or inflatable support may be positioned at or around the central axis of the truck wheel cavity 70 to hold the generally flexible wheel disk in a more aesthetically desired or aerodynamically desired shape. It should be understood that a disk of foamed polymer could be substituted for the preferred textile material, so long as the substitute material had the light weight and flexible characteristics taught herein. Also, while a zipper attachment between the mounting assembly and the streamlining disk is the preferred way of assembling, other secure systems could be used, such as a paired hook and loop fastener strips, lacing systems using eyelets or speed lacing lugs, or other strong, generally continuous attachment scheme.

FIG. 13 provides a more detailed view of slightly alternative attachment portioned construction. First, two generally rigid wire rings are shown, the first shown on the left include two kinked portions, one of which comprises a tubular metal connection to hold the two ends of the single length of spring steel wire which is used to form the resilient ring. This ring also includes a kinked portion 180 degrees opposite from the attachment to the combination of these two kink portions provides a good degree of flexing but still does not compromise the overall resilient but firm connection between the ring and the inner facing surface of the wheel. The other ring to the right does not include the extra kinked portion but does have the tubular portion including the kink at one location on its diameter. These two rings or similar rings are shown attached to the flexible textile strips that holds the two rings to either side of the drop center. This is illustrated by the typical motor vehicle wheel shown just above those exemplary rings. FIG. 13 shows in detail how these rings are positioned along and around the central wheel cavity 70. Note that the textile strips do not need to extend entirely around the inner circumference of wheel. Rather, the two strips are interrupted only at the kinked portions of the rings, but help position the rings precisely to either side of the drop center. It could be that any interruptions, slits, hook and loop straps, etc., spanning the two rings should be angled to take advantage of the possibility that the outer ring, with the greater rotational inertia of its attached laminar disk, will be more likely to slip relative to the wheel surface during hard braking by the motor vehicle. If the slits, interruptions, or straps are angled relative to the axis of rotation such that they tend to cinch the two rings towards one another, the frictional engagement would increase as engaging force of the material spanning the drop center increases.

FIG. 13 also shows the kinked portions aligned to each other at the same radial position, that radial position is defined by the air valve stem.

The method of using the disclosed device will now be detailed, referring to the Figures. The first step in the preferred method is to clean and lubricate the inner surface 90 of the wheel cavity 70, especially the drop center with a spray of water. This reduces the grit that could abrade the flexible connection and other parts of the disclosed device, but also reduces friction so that the inner ring 16 can be pulled through the smaller diameter of the drop center more easily using the pull tabs 22. The installer reaches through the opening 80 of the outer ring and zipper track 18, and grabs the two pulls tabs 22 marked with the number "1" lining them up to straddle the filler valve. The holes 24 provide convenient grips to help the installer pull the ring into its initial position at the filler valve. Then, working with the next tabs out from these two marked with "1", the ring 21 is pulled through the drop center diameter until it comes to rest in the annular valley between the drop center and the wheel face 50. Any slight radial adjustment of the ring 16, the flexible material 19, and the second ring should be done now while the wheel surfaces are still wet and slightly slippery.

Once the attachment system is in place and adjusted, the cover 13 is zipped onto the zipper track 18, thus closing the access to the attachment system and closing of course the wheel cavity 70. Any slight misalignment of the outer ring relative to the tapered portion 66 of the wheel will usually go away during the initial few kilometers of over the road travel due to the self centering operation of the attachment system as discussed above.

Once the basic idea of a flexible attachment and generally flexible wheel disk is understood, variations become clearly obvious. For example other attachment schemes besides a circumferential zipper might be contemplated for particular applications. For example one could merely provide an access port or slit through the wheel disk. This would permit the installer to manipulate the inner and outer rings and to adjust the hook and loop fastener straps between the two rings without having to completely dismount the disk from the attachment assembly. This slit could extend only partially across the center of the wheel disk or entirely across the center of the wheel disk in a single straight line, so long as it is large enough to permit the hand or hands of the installer to access the inner and outer rings, to locate the ring's kinked portions relative to the valve stem, and to inspect the wheel and the proper positioning of all of the parts of the streamlining disk assembly during installation and during use.

The disk portion of the streamlining assembly lends itself to advertising copy, graphics and the like. The textile material used to make the disk could be treated to receive conventional automotive paints and other finishes so that the disk portion could be coordinated with the aesthetics of the motor vehicle. Alternatively company logos could be applied to the disk using conventional silk screening or printing techniques.

Also, it should be clear from this disclosure that other ways to hold the generally stiff, resilient, springy rings on each side of the drop center portion are contemplated herein. For example, the rings could be completely or partially enclosed in injection molded shapes. These shapes could include attachment loops to receive flexible straps, laces, or cords to cinch the rings across the drop center portion. Such molded shapes could also include high friction materials and surfaces to help prevent relative circumferential slipping during braking or other environmental forces as mentioned above. Variations on the disclosed closing or streamlining device 10 and its method of mounting and use become immediately apparent For example, the preferred device uses a strong zipper to form a releaseable connection between that attachment system 12 and the cover portion 13. Thus, the cover portion can be completely removed during installation, and the portions 12 and 13 could each be replaced or refurbished as needed while the remaining portions reused. But the essential function of the zipper 15, that is to provide manual access to interior cavity 70 of the wheel 11 for pulling the attachment system into position or for its removal, for adjusting tire pressure, or for visual inspection of the device 10 while in place in the wheel or for visually inspecting the wheel or the truck hub to which it is attached could be accommodated by a shorter zipper (or some other releaseable fastener system known in the art) that only goes partially around the circumference of the cover, or goes across only a center portion of the cover 13. For example, a slit through the cover 13 sized to permit a person's hand or hands to pass through to the wheel cavity 70 could cut across the center of the wheel. This slit could be closed by a short zipper, hook and loop fasteners of known type, lacing, etc. Such a modification may not have the advantages provided by the preferred system detailed above, such as full access to the entire attachment system, permitting the rings to flex during installation without being constrained by the cover, and providing interchangeable or multiple covers for a single attachment system.

The beneficial effects of providing a shaped cover to close off motor vehicle wheel cavities have been shown. It is easy to see additional benefits when one considers that over the life of a typical tractor-trailer truck, fuel cost alone can be a staggering burden, equaling if not exceeding the initial capital cost of the truck. For example, if such a truck traversed 110,000 miles a year over seven years fuel cost (currently at around $3.00 per gallon for diesel fuel) could amount to 70% of the cost of ownership. Thus any appreciable reduction in fuel expenditures could easily pay for the cost of these remarkably efficient and cost effective wheel covers. Initial tests under controlled conditions indicate that fuel savings for between about 0.975% and 2% could be expected as a result of using the disclosed wheel cover system and method, depending on the number of wheels covered, location of the wheels covered, and driving conditions.

The invention claimed is:

1. A method for covering a wheel cavity of a wheel of a vehicle, the wheel having a face, a rim having a rim interior defining the wheel cavity, and a drop center on the rim having a drop center diameter less than a diameter of the wheel; the method comprising:
   providing a cover device, the cover device comprising:
      a generally flat cover portion to cover an opening of the wheel cavity, the opening facing outward from the vehicle along an axis of the wheel;
      an attachment system to engage the rim interior, where the attachment system extends axially across the drop center portion; and
      a releasable fastener for securing the cover portion to the attachment system;
   positioning the attachment system within the wheel cavity; and
   attaching the cover portion to the attachment system with the releasable fastener, such that the cover portion covers substantially all of the outward facing opening of the wheel.

2. The method of claim 1, wherein the generally flat cover portion comprises a flexible lamina and has a generally circular periphery, and wherein attaching the cover portion to the attachment system with the releasable fastener comprises:
   engaging the releasable fastener to the cover portion; and
   translating the releasable fastener about the circular periphery of the cover portion to engage the circular periphery of the cover to the attachment system.

3. The method of claim 2, wherein the releasable fastener is a zipper.

4. The method of claim 2, wherein the releasable fastener is a hook and loop fastener.

5. The method as set forth in claim 1, wherein positioning the attachment system within the wheel cavity further comprises;
   inserting the attachment system into the wheel cavity; and
   extending the attachment system axially across the drop center portion by maneuvering one or more tabs engaged to the attachment system.

6. A device for covering an axially-outwardly facing cavity of a wheel of a motor vehicle, the device compriing:
   a cover portion; and
      an attachment system for holding the cover portion over the cavity of the wheel, the attachment system further comprising:
         a first generally-circular ring to engage an inner surface of the wheel on a first side of a drop center;
         a second generally circular ring to engage the inner surface of the wheel on a second side of the drop center; and
         a flexible material engaged to both the first and second rings.

7. The device of claim 6, wherein the first ring is configured to engage the inner surface of the wheel cavity at a position proximal to a face of the wheel on an inward side of the drop center and the second ring is configured to engage the inner surface of the wheel cavity at a position opposite the drop center at an outward side of the drop center.

8. The device of claim 6, wherein the cover portion is disk shaped, and the device further includes a releasable fastener to attach the cover portion to the attachment device.

9. The device of claim 6, wherein the cover portion comprises a generally flexible lamina disk and a fastener portion about the periphery of the disk to engage a releasable fastener.

10. The device of claim 6, wherein the releasable fastener is a zipper.

11. The device of claim 9, wherein the releasable fastener is a hook and loop fastener.

12. A device for covering for the cavity of a wheel of a vehicle, the device comprising:
   a circular disk of a first textile material having a first releasable fastener portion disposed about the periphery or the disk;
   a cylindrical frame assembly to be received in the wheel comprising:
      a first flexible ring having a first diameter approximately equal to a first diameter of an inner surface of the wheel;
      a second flexible ring having a second diameter approximately equal to a second diameter of the inner surface of the wheel;
      a flexible second textile material engaged to the first flexible ring and the second flexible ring, where the second textile material forms a sidewall of the cylindrical frame assembly; and
      a second releasable fastener portion engaged to the second textile material about a periphery of the first flexible ring, wherein the first releasable fastener portion is configured to engage the second releasable fastener portion thereby connecting the circular disk to the cylindrical frame assembly.

13. The device of claim 12, wherein the first diameter of the inner surface of the wheel is different than the second diameter of the inner surface of the wheel.

14. The device of claim 12, wherein the first and second releasable fastener portions form a hook and loop fastener.

15. The device of claim 12, wherein the first and second releasable fastener portions form a zipper fastener.

16. A device to cover and streamline a wheel of a vehicle, the wheel including a rim for mounting a tire, a wheel face adjacent an inner portion of the rim, and an outer portion of the rim, the wheel face and an inner surface of the wheel defining an open outward facing cavity, the inner surface of the wheel including a boss having an inner diameter less than a first rim diameter at the inner portion of the rim between the face and the boss, the rim also including a tapered portion which tapers inwardly towards a center of the wheel from the outer portion of the rim towards the boss, the device comprising:
   a wheel cover configured to cover the cavity of the wheel with an outer perimeter of the wheel cover positioned proximal to the tapered portion and within the cavity or flush with an outer edge of the rim; and
   an attachment system releasably engaged to the wheel cover, the attachment system including a first portion configured to engage the inner surface of the wheel at the inner portion of the rim and a flexible material configured to connect the first portion and the wheel cover, the flexible material configured to conform to the inner surface of the wheel and frictionally engage the boss, the flexible material and the boss retaining the outer perimeter of the wheel cover proximal to the tapered portion.

17. The device for of claim 16, wherein the boss is a drop center.

18. The device for of claim 16, wherein the first portion is a resilient ring.

19. The device for of claim 18, wherein the flexible material is a band of textile material engaged to the resilient ring.

* * * * *

UNITED STATES PATENT AND TRADEMARK OFFICE
CERTIFICATE OF CORRECTION

| | | |
|---|---|---|
| PATENT NO. | : 8,783,788 B2 | Page 1 of 1 |
| APPLICATION NO. | : 12/440726 | |
| DATED | : July 22, 2014 | |
| INVENTOR(S) | : Jonathan E. Fleck | |

It is certified that error appears in the above-identified patent and that said Letters Patent is hereby corrected as shown below:

In the Claims,

In claim 10, column 8, line 13, of the issued patent, delete "6" and insert --9--

Signed and Sealed this
Tenth Day of March, 2015

Michelle K. Lee
*Deputy Director of the United States Patent and Trademark Office*